US008803438B2

(12) United States Patent
Sutardja et al.

(10) Patent No.: US 8,803,438 B2
(45) Date of Patent: Aug. 12, 2014

(54) METHOD AND APPARATUS FOR CURRENT CONTROL WITH LED DRIVER

(71) Applicant: Marvell World Trade Ltd., St. Michael (BB)

(72) Inventors: Pantas Sutardja, Los Gatos, CA (US); InHwan Oh, Cupertino, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 43 days.

(21) Appl. No.: 13/720,174

(22) Filed: Dec. 19, 2012

(65) Prior Publication Data

US 2013/0162156 A1    Jun. 27, 2013

Related U.S. Application Data

(60) Provisional application No. 61/580,130, filed on Dec. 23, 2011.

(51) Int. Cl.
*H05B 41/16* (2006.01)
*H05B 41/24* (2006.01)

(52) U.S. Cl.
USPC ........... 315/254; 315/250; 315/276; 315/279; 315/291; 315/307

(58) Field of Classification Search
None
See application file for complete search history.

(56) References Cited

U.S. PATENT DOCUMENTS

| 7,872,427 B2 * | 1/2011 | Scianna ........................ 315/291 |
| 2010/0109571 A1 * | 5/2010 | Nishino et al. ................ 315/307 |
| 2012/0200229 A1 * | 8/2012 | Kunst et al. .................... 315/186 |

* cited by examiner

*Primary Examiner* — Anh Tran (57) ABSTRACT

Aspects of the disclosure provide a circuit that includes a detection circuit and a controller. The detection circuit is configured to detect a starting of a conduction in a power supply provided via an electronic transformer. The controller is configured to control a current regulating circuit to pull a current from the electronic transformer at a pre-determined level during a time duration following the starting of the conduction, and pull the current at a reduced level according to a pre-determined profile after the time duration.

20 Claims, 5 Drawing Sheets

METHOD AND APPARATUS FOR CURRENT CONTROL WITH LED DRIVER

INCORPORATION BY REFERENCE

This present disclosure claims the benefit of U.S. Provisional Application No. 61/580,130, "New Current Control Method for Electronics Transformer with Triac Dimmer for low Voltage LED Driver Solution" filed on Dec. 23, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, halogen lamps, and the like.

SUMMARY

Aspects of the disclosure provide a circuit that includes a detection circuit and a controller. The detection circuit is configured to detect a starting of a conduction in a power supply provided via a circuit having a transformer. The controller is configured to control a current regulating circuit to pull a current from the circuit having the transformer at a pre-determined level for a time duration following the starting of the conduction, and pull the current at a reduced level according to a pre-determined profile after the time duration.

In an example, the detection circuit is configured to detect the starting of a conduction angle adjusted by a phase cut type dimmer.

According to an aspect of the disclosure, the controller is configured to control the current regulating circuit to pull the current from the circuit having the transformer at the pre-determined level for the time duration following the starting of the conduction to enable the circuit having the transformer to start a self-oscillation.

Further, in an example, the controller is configured to pull the current according to the pre-determined profile that increases the current when a voltage of the power supply drops. In another example, the controller is configured to pull the current according the pre-determined profile that maintains the current at a substantially stable level when a voltage of the power supply drops. In another example, the controller is configured to pull the current according to the pre-determined profile that reduces the current when a voltage of the power supply drops.

Aspects of the disclosure provide a method. The method includes detecting a starting of a conduction in a power supply provided via a circuit having a transformer, pulling a current from the circuit having the transformer at a pre-determined level for a time duration following the starting of the conduction, and pulling the current at a reduced level according to a pre-determined profile after the time duration.

Aspects of the disclosure provide an apparatus that includes one or more light emitting diodes (LEDs), and an LED driver to drive the LEDs. The LED driver includes a detection circuit, a current regulating circuit, and a controller. The detection circuit is configured to detect a starting of a conduction in a power supply provided via a circuit having a transformer. The current regulating circuit is configured to regulating a current pulled from the circuit having the transformer. The controller is configured to control the current regulating circuit to pull the current at a pre-determined level for a time duration following the starting of the conduction, and pull the current at a reduced level according to a pre-determined profile after the time duration.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
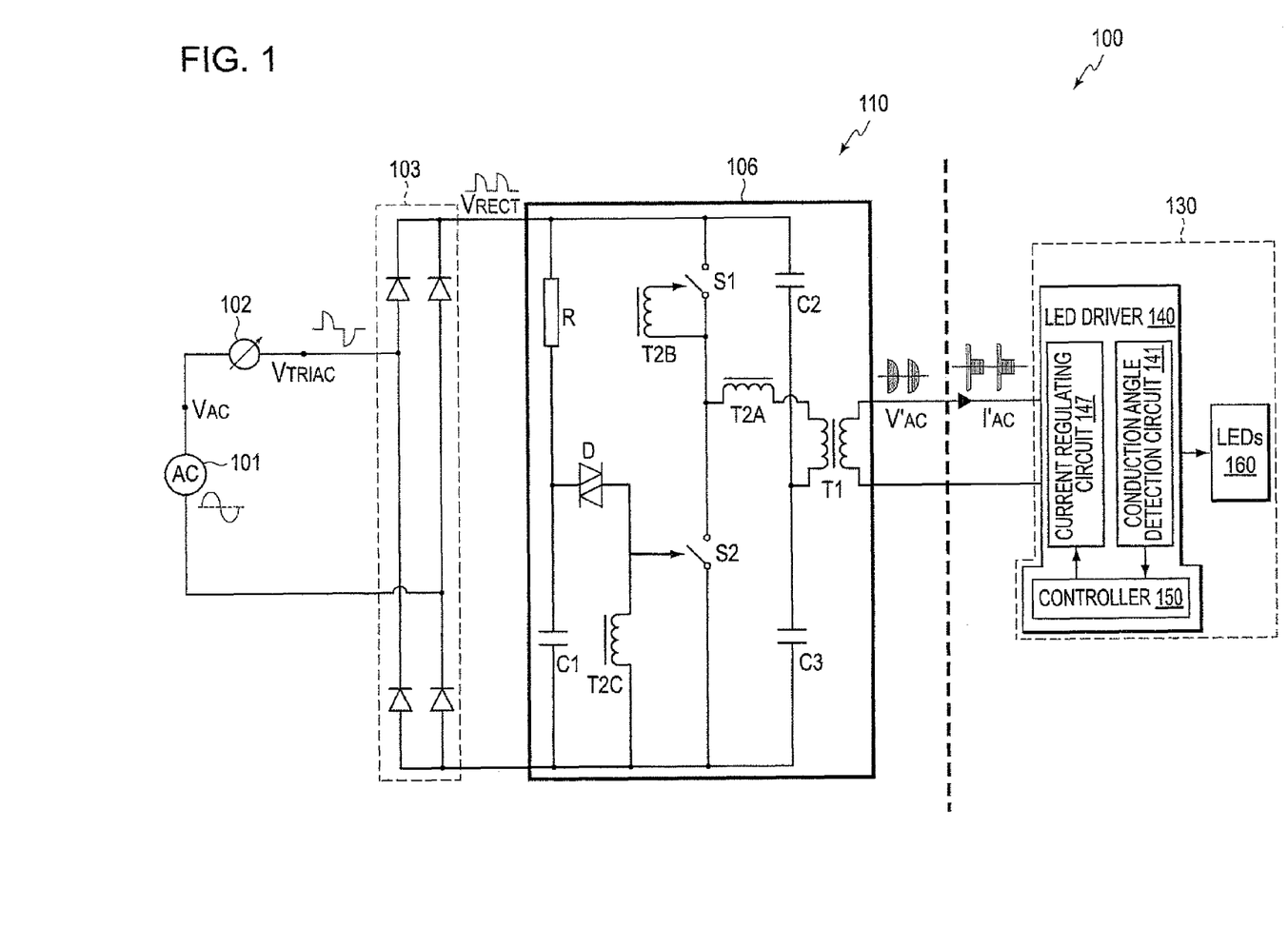
FIG. 1 shows a block diagram of an electronic system 100 according to an embodiment of the disclosure.

FIG. 1 shows a block diagram of an electronic system 100 according to an embodiment of the disclosure. The electronic system 100 includes a power supply portion 110 and a lighting system 130. The power supply portion 110 includes an electronic transformer 106. The lighting system 130 includes a driver and a lighting device, such as a light emitting diode (LED) driver 140 and an LED device 160 coupled together as shown in FIG. 1. The driver, such as the LED driver 140, is configured to drive the lighting device, such as the LED device 160, in a manner to support the operation of the electronic transformer 106.

According to an embodiment of the disclosure, the power supply portion 110 is an existing power supply, and is configured for supplying power to a different lighting system from the lighting system 130, such as a halogen lamp. Besides the electronic transformer 106, the power supply portion 110 includes other components, such as an energy source 101, a dimmer 102, a rectifier 103, and the like.

In the FIG. 1 example, the energy source 101 is an alternating current (AC) voltage supply to provide an AC voltage $V_{AC}$, such as 110V AC supply voltage of 50 Hz, 220V AC supply voltage of 60 Hz, and the like. The dimmer 102 is configured to control electric energy from the energy source 101 to the lighting system 130, and thus controls output light from the lighting system 130.

According to an aspect of the disclosure, the dimmer 102 is a phase cut type of dimmer. In an example, the AC voltage supply has a sine wave shape, and the dimmer 102 includes a leading edge triode for alternating current (TRIAC) having an adjustable dimming angle α within [0, π]. Every time the AC voltage $V_{AC}$ crosses zero, the leading edge TRIAC stops firing charges for a dimming angle α. The dimming angle α is adjusted to turn on/off the dimmer 102 and to adjust the output power to a device driven by the power supply portion 110, such as a halogen lamp, the lighting system 130. For example, when the dimming angle cc is equal to π, the dimmer 102 is turned off, and no power is output to the device driven by the power supply portion 110; when the dimming angle α is reduced from π, the dimmer 102 is turned on to output power to the device; when the dimming angle α is further reduced, the output power of energy source increases; and when the dimming angle α is zero, the output power is maximized. Thus, in each cycle [0, 2π], when the phase of the AC voltage $V_{AC}$ is within [0, α] or [π, π+α], a TRIAC voltage $V_{TRIAC}$ output from the dimmer 102 is zero; and when the phase of the AC voltage $V_{AC}$ is within [α, π] or [π+α, 2π], the TRIAC voltage $V_{TRIAC}$ follows the AC voltage $V_{AC}$. Generally, [0, α] and [π, π+α] are referred to as non-conduction angles. Similarly, [α, π] and [π+α, 2π] are referred to as conduction angles.

The rectifier 103 rectifies the received AC voltage to a fixed polarity, such as to be positive. In the FIG. 1 example, the rectifier 103 is a bridge rectifier 103. The bridge rectifier 103 receives the AC voltage, generates a rectified voltage $V_{RECT}$, and provides the rectified voltage $V_{RECT}$ to the electronic transformer 106.

According to an embodiment of the disclosure, the electronic transformer 106 is configured to convert a relatively high AC supply voltage, such as 110V AC supply voltage, 220V AC supply voltage, and the like, to a relatively low AC supply voltage, such as 12V AC supply voltage, and the like, to drive a halogen lamp, for example. Generally, a halogen lamp can have a power from 50W to 500W. In an embodiment, the electronic transformer 106 is designed to provide the electrical power above a threshold, such as 50W. Because the operation of the electronic transformer 106 is load dependent, thus when the load drains lower power from the electronic transformer 106, such as lower than the threshold, the electronic transformer 106 may not operate normally.

In an embodiment, the lighting system 130 is a low power LED lighting system that can be used to replace a halogen lamp. For example, the lighting system 130 is a 10W MR16 LED system that provides about the same light output as a 50W MR16 halogen lamp. The 10W MR16 LED system can be coupled to the power supply portion 110 to replace a 50W MR16 halogen lamp. To enable the existing power supply portion 110 to operate on the low power load, the LED driver 140 in the lighting system 130 is configured to drain a current from the electronic transformer 106 in a manner to enable and sustain the operation of the electronic transformer 106.

In the FIG. 1 example, the electronic transformer 106 includes a self-oscillating circuit of a resonant frequency. The resonate frequency is load dependent, and is in a range, for example, from 40 KHz to 100 KHz based on the load. Energy is converted from the relatively high AC supply voltage to the relatively low AC supply voltage based on the self-oscillating circuit. In an example, the electronic transformer 106 is configured to convert 120V 50 Hz AC supply voltage to a 12V 50 Hz AC supply voltage that is modulated by the resonant frequency of the self-oscillating circuit.

Specifically, in the FIG. 1 example, the electronic transformer 106 includes a resistor R, capacitors C1, C2 and C3, a diac D, two switches S1 and S2, a first transformer T1 of a primary winding and a secondary winding, and a second transformer formed by a primary winding T2A and secondary windings T2B and T2C. The primary winding of the first transformer T1 and the primary winding T2A are coupled in series. The first transformer T1 drives output devices, and the second transformer is a feedback transformer that generates control signals, such as control voltages, to control the switches S1 and S2 based on the current output from the first transformer T1. These elements are couple together as shown in FIG. 1.

It is noted that, in an embodiment, the switches S1 and S2 are implemented by semiconductor switches, such as bipolar transistors, metal-oxide-semiconductor field effect transistors (MOSFET), insulated gate bipolar transistor (IGBT), and the like.

During operation, in an example, the electronic transformer 106 receives the rectified voltage $V_{RECT}$. At a starting of a conduction angle, the rectified voltage $V_{RECT}$ charges the capacitor C1 via the resistor R. As soon as the capacitor is charged to the breakdown voltage of the diac D, the diac D is switched on and a control signal, such as a control voltage, is applied to a control terminal of the switch 52, such as a base terminal of a bipolar transistor, a gate terminal of a MOSFET, and the like. Then, the switch 82 is closed, and the oscillation may start. The primary winding of the first transformer T1, the primary winding and the secondary windings T2A, T2B and T2C of the second transformer are arranged to make the switches S1 and S2 alternatively open and close at the resonant frequency, for example, in the order of tens of KHz. The secondary winding of the first transformer T1 then outputs a converted AC voltage $V'_{AC}$ to drive the load device. The converted AC voltage $V'_{AC}$ has the same AC frequency as the energy source 101, and is modulated by the resonant frequency. When the load current can sustain generating suitable control voltages to control the switches S1 and S2, the oscillation continues. The oscillation stops at the end of the conduction angle, or stops due to lack of load current support.

According to an embodiment of the disclosure, the electronic transformer 106 is designed for driving resistive load, such as a halogen lamp. The oscillation starts when an output current $I'_{AC}$ from the electronic transformer 106 is larger than an ignition level. The oscillation continues when the output current $I'_{AC}$ maintains a sustain level to enable the switches S1 and S2 to open and close.

According to an aspect of the disclosure, the LED driver 140 is configured to drain a current from the electronic transformer 106 in a manner to enable the electronic transformer 106 to start oscillation and sustain oscillation as long as possible. Specifically, in an example, the LED driver 140 includes a conduction angle detection circuit 141, a current regulating circuit 147, and a controller 150. These elements are coupled together as shown in FIG. 1.

The conduction angle detection circuit 141 is configured to detect a starting of a conduction angle. The conduction angle detection circuit 141 can be implemented by any suitable circuit. In an example, the conduction angle detection circuit 141 includes a comparator circuit to compare a received voltage with a reference voltage and a latch to catch the comparison result. For example, when the received voltage is larger than the reference voltage, the comparison result changes from logic "0" to "1", the latch catches the change, and the conduction angle detection circuit 141 detects a starting of a conduction angle.

The current regulating circuit 147 is configured to regulate a current $I'_{AC}$ pulled from the electronic transformer 106. The current regulating circuit 147 can be implemented by any suitable techniques. In an example, the current regulating circuit 147 includes a switch that is controlled by width-modulated pulses. The pulses are high frequency pulses. The width of the pulses is modulated to regulate the current $P'_{Ac}$ pulled from the electronic transformer 106. It is noted that, in an example, the current regulating circuit 147 is coupled to the electronic transformer 106 via suitable circuit components, such as rectifier, and the like.

The controller 150 is configured to control the current regulating circuit 147 based on a detection signal from the conduction angle detection circuit 141. The controller 150 controls the current regulating circuit 147 in a manner that the current $P_{AC}$ pulled from the electronic transformer 106 supports the electronic transformer 106 to be operational. For example, the controller 150 generates the width-modulated pulses and provides the width-modulated pulses to the current regulating circuit 147 to achieve the load current control.

In an embodiment, when the detection signal is indicative of a starting of a conduction angle, the controller 150 controls the current regulating circuit 147 to pull the current at a pre-determined level for a time duration following the starting of the conduction angle. The current at the pre-determined level enables the self-oscillating circuit in the electronic transformer 106 to start oscillation. In an example, the time duration lasts about 50 μs to 100 μs. After the time duration, the controller 150 controls the current regulating circuit 147 to reduce the current level based on a pre-determined profile to sustain the electronic transformer 106 to operate.

It is noted that the LED driver 140 can include other suitable elements. For example, the LED driver 140 includes a rectifier configured to rectify the converted AC voltage $V'_{AC}$ to a fixed polarity. It is also noted that the LED driver 140 can be configured to have other suitable features. For example, the LED driver 140 is configured in a boost-buck configuration, such as disclosed in Applicant's co-pending application Ser. No. 13/585,170, filed Aug. 14, 2012, which is incorporated herein by reference in its entirety.

In an embodiment, the LED driver 140 is implemented on a printed circuit board (PCB). The PCB includes discrete components and one or more integrated circuit (IC) chips. In an example, the controller 150 is implemented on an IC chip. The conduction angle detection circuit 141 and the current regulating circuit 147 can include circuits on the IC chip, and can include off-chip components. The LED device 160 includes a plurality of LEDs that are suitably coupled in series and/or in parallel. The PCB board and LED device 160 are assembled together in a lighting package. The lighting package is configured to have similar power interface as a halogen lamp, such that the lighting package can be used to replace the halogen lamp.

According to an embodiment of the disclosure, the electronic system 100 can be suitably modified to drive multiple lighting systems 130. In an example, a power bus is connected to the output of the power supply portion 110, and multiple lighting systems 130 can be coupled to the power bus to receive power from the power supply portion 110. In an example, when the power supply portion 110 is designed to drive a 50W MR16 halogen lamp, the power supply portion 110 can be used to drive, for example, one to five 10W MR16 LED lighting systems 130.

Figure 2:
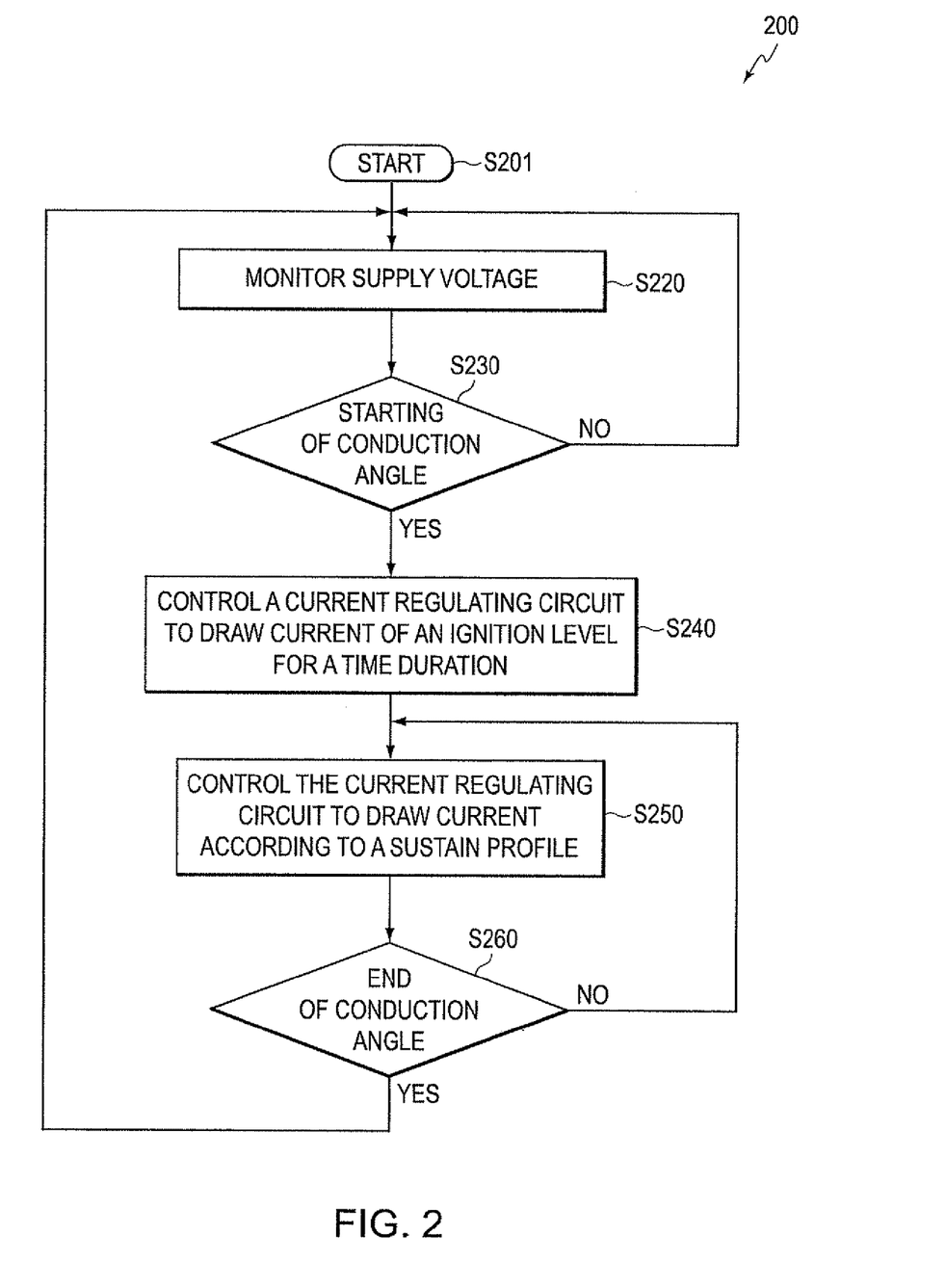
FIG. 2 shows a flow chart outlining a process example 200 according to an embodiment of the disclosure.

FIG. 2 shows a flow chart outlining a process example 200 executed by the LED driver 140 according to an embodiment of the disclosure. The process starts at S201, and proceeds to S220.

At S220, a supply voltage is monitored. For example, the supply voltage is provided by the electronic transformer 106 as an AC supply voltage of 50 Hz or 60 Hz, and is modulated by a relatively high frequency. The supply voltage is also phase cut by the dimmer 102 to include non-conduction angles and conduction angles. In an embodiment, the conduction angle detection circuit 141 receives a voltage signal in response to the supply voltage, and monitors the voltage signal. The voltage signal can be generated via various circuit components, such as a rectifier, capacitors, resistors, and the like.

At S230, the LED driver 140 determines whether a starting of a conduction angle is detected. For example, when the voltage signal is about zero, the conduction angle detection circuit 141 determines that the supply voltage is at a phase in a non-conduction angle, and the process returns to S220 to continue monitoring the supply voltage. When the voltage signal starts to increase above a threshold, the conduction angle detection circuit 141 determines that the supply voltage is at a starting of a conduction angle and provides a detection signal to the controller 150, and the process proceeds to S240.

At S240, a current of an ignition level is pulled from the electronic transformer for a time duration following the starting of the conduction angle. For example, the controller 150 controls the current regulating circuit 147 to pull the current of the ignition level from the electronic transformer. In an example, the ignition level and the time duration are pre-determined to enable a self-oscillating circuit in the electronic transformer 106 to start oscillation.

At S250, a current of a sustain profile is pulled from the electronic transformer after the time duration. For example, the controller 150 controls the current regulating circuit 147 to pull the current of the sustain profile from the electronic transformer after the time duration. In an example, the sustain profile is predetermined to sustain the self-oscillating circuit in the electronic transformer 106 to continue oscillation as long as possible.

At S260, the LED driver 140 determines whether the conduction angle ends. For example, when the voltage signal drops to about zero, and stays at the zero for a while, the conduction angle ends, and process returns to S220; otherwise, the process returns to S250.

Figure 3:
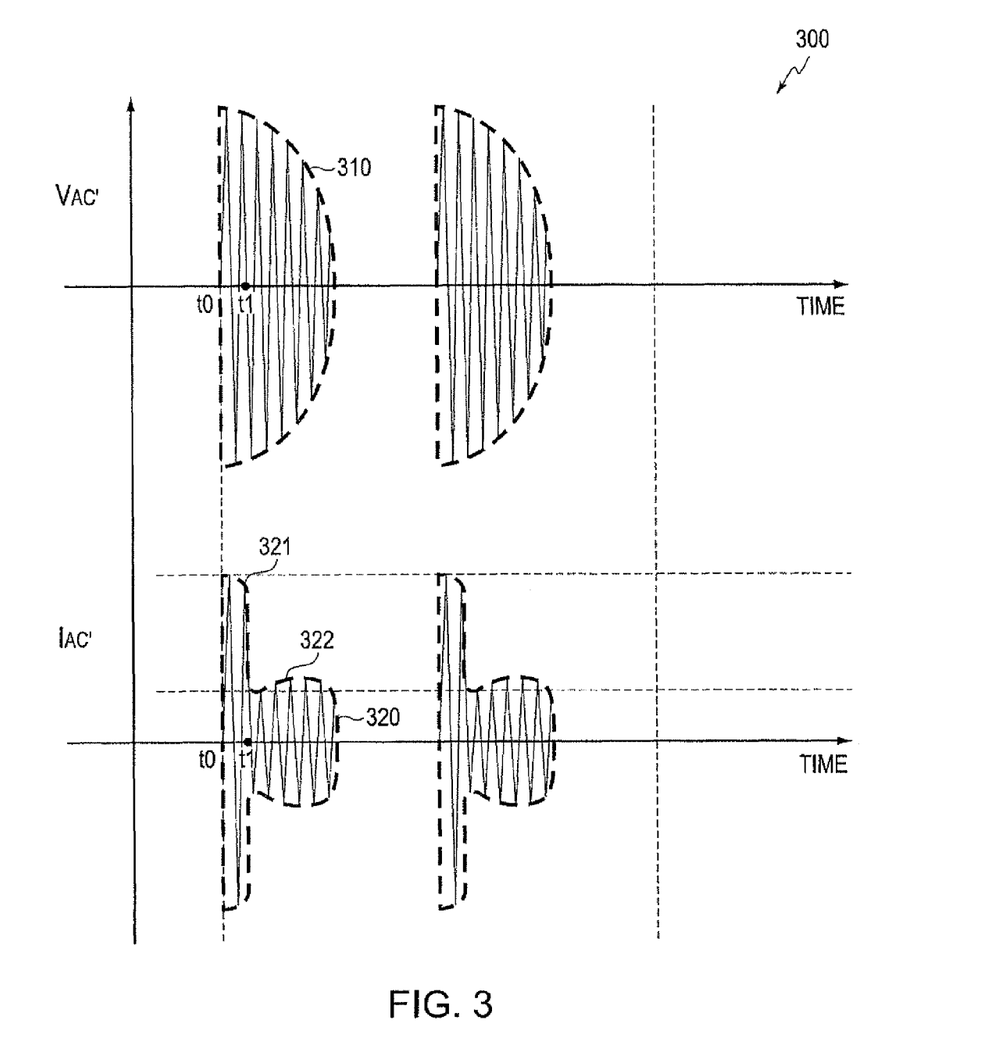
FIG. 3 shows a plot 300 of voltage and current waveforms according to an embodiment of the disclosure.

FIG. 3 shows a plot 300 of voltage and current waveforms according to an embodiment of the disclosure. The plot 300 includes a first waveform 310 for the converted AC voltage $V'_{AC}$ output from the electronic transformer 106, and a second waveform 320 for the current $I'_{AC}$ pulled by the LED driver 140 from the electronic transformer 106.

In the FIG. 3 example, at time t0, the converted AC voltage $V'_{AC}$ starts to increase, and the LED driver 140 detects a starting of a conduction angle. The LED driver 140 pulls the current of the ignition level, as shown by 321 for a time duration, such as from time t0 to time t1, to enable the electronic transformer 106 to start operation. Specifically, in an example, the current at the ignition level during the time duration enables the self-oscillating circuit in the electronic transformer 106 to start oscillation.

At time t1, when the self-oscillating circuit oscillates, the LED driver 140 reduces the current to a sustain level to sustain the self-oscillating circuit to oscillate. In addition, in the FIG. 3 example, when the converted AC voltage $V'_{AC}$ drops, the LED driver 140 increases the current pulled from the electronic transformer 106, as shown by 322. In an example, the current is increased in a manner to maintain a relatively stable electrical power output from the electronic transformer 106.

Figure 4:
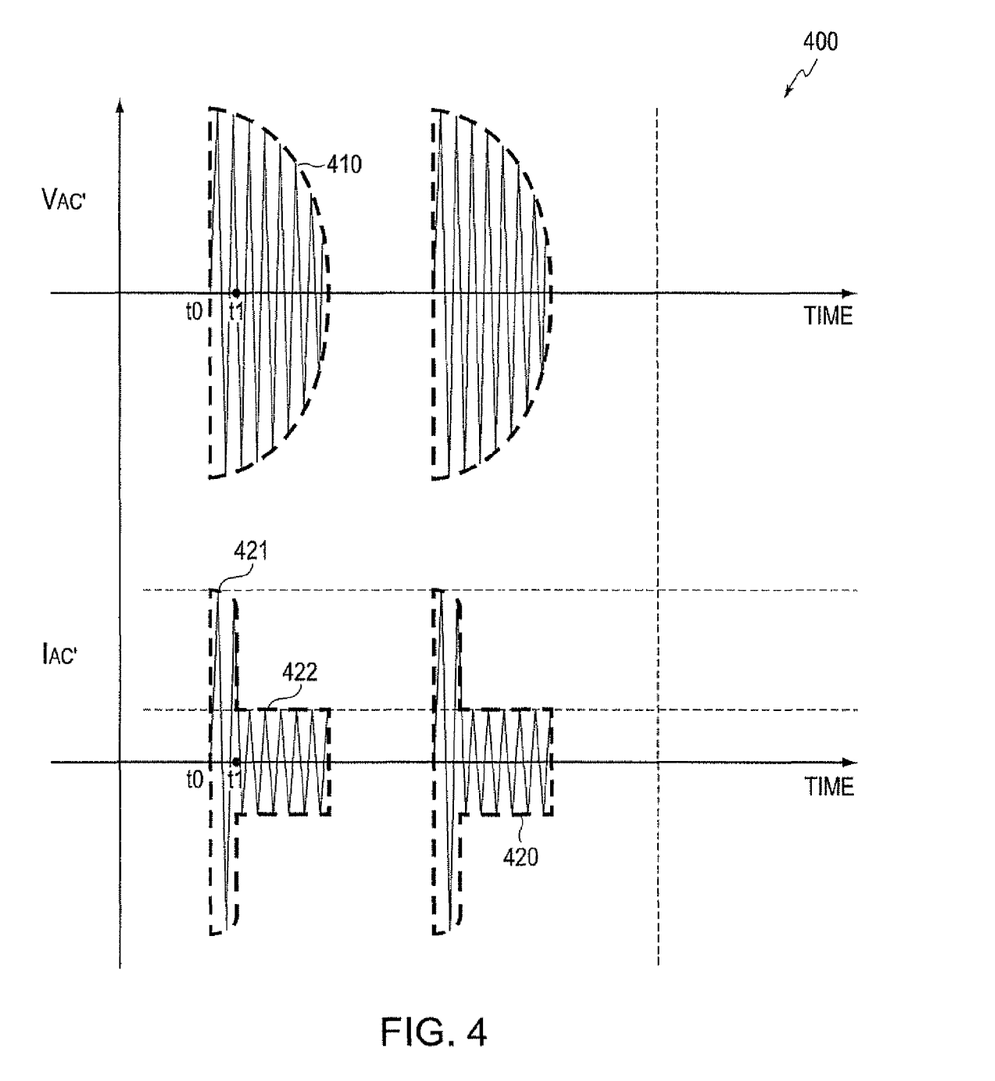
FIG. 4 shows another plot 400 of voltage and current waveforms according to an embodiment of the disclosure.

FIG. 4 shows another plot 400 of voltage and current waveforms according to an embodiment of the disclosure. The plot 400 includes a first waveform 410 for the converted AC voltage $V'_{AC}$ output from the electronic transformer 106, and a second waveform 420 for the current $I'_{AC}$ pulled by the LED driver 140 from the electronic transformer 106.

In the FIG. 4 example, at time t0, the converted AC voltage $V'_{AC}$ starts to increase, and the LED driver 140 detects a starting of a conduction angle. The LED driver 140 pulls the current of the ignition level, as shown by 421 for a time duration, such as from time t0 to time t1, to enable the electronic transformer 106 to start operation. Specifically, in an example, the current at the ignition level during the time duration enables the self-oscillating circuit in the electronic transformer 106 to start oscillation.

At time t1, when the self-oscillating circuit oscillates, the LED driver 140 reduces the current to a sustain level to sustain the self-oscillating circuit to oscillate. In addition, in the FIG. 4 example, when the converted AC voltage $V'_{AC}$ drops, the LED driver 140 maintains the current pulled from the electronic transformer 106 relatively constant, as shown by 422. In an example, the current is maintained relatively constant as long as possible.

Figure 5:
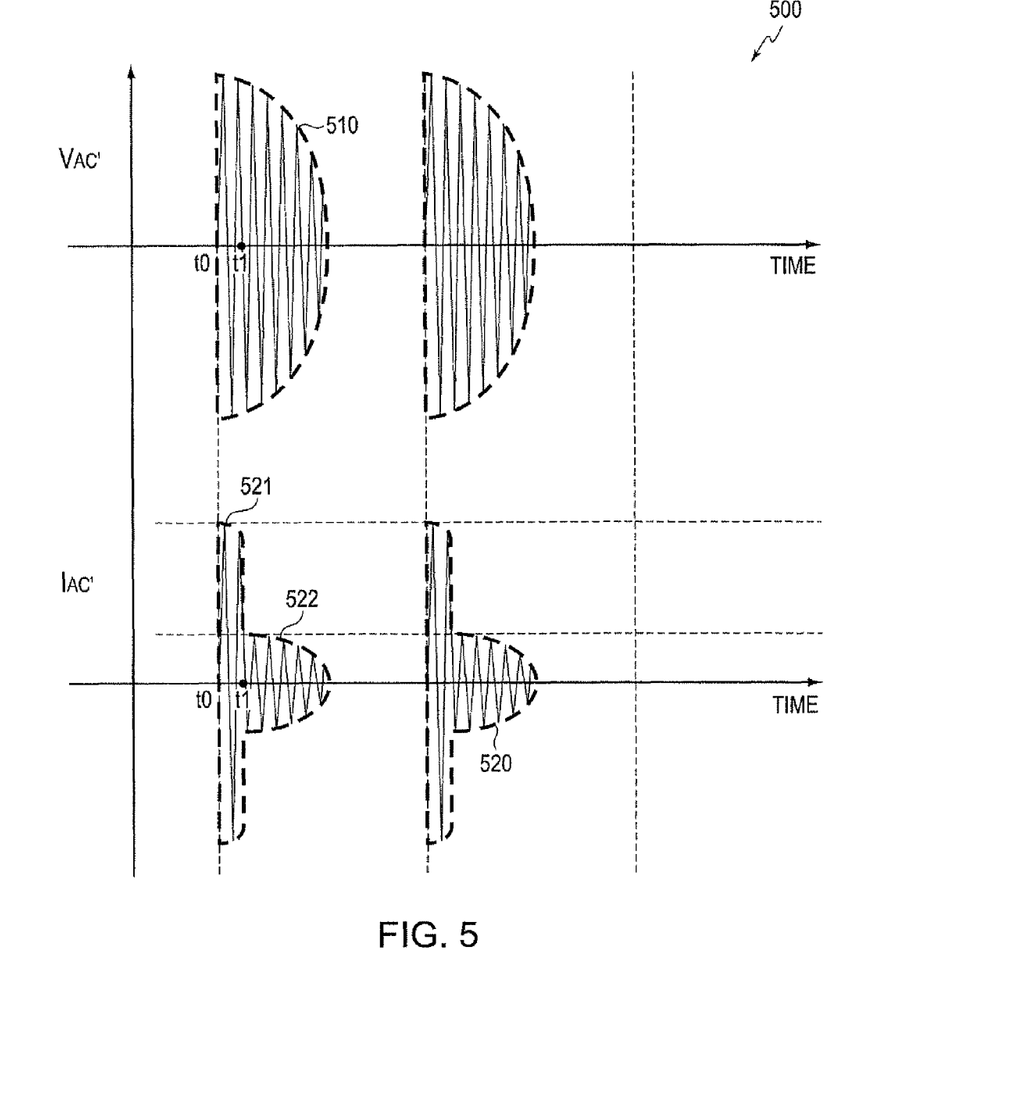
FIG. 5 shows another plot 500 of voltage and current waveforms according to an embodiment of the disclosure.

FIG. 5 shows another plot 500 of voltage and current waveforms according to an embodiment of the disclosure. The plot 500 includes a first waveform 510 for the converted AC voltage $V'_{AC}$ output from the electronic transformer 106, and a second waveform 520 for the current $I'_{AC}$ pulled by the LED driver 140 from the electronic transformer 106.

In the FIG. 5 example, at time t0, the converted AC voltage $V'_{AC}$ starts to increase, and the LED driver 140 detects a starting of a conduction angle. The LED driver 140 pulls the current of the ignition level, as shown by 521 for a time duration, such as from time t0 to time t1, to enable the electronic transformer 106 to start operation. Specifically, in an example, the current at the ignition level during the time duration enables the self-oscillating circuit in the electronic transformer 106 to start oscillation.

At time t1, when the self-oscillating circuit oscillates, the LED driver 140 reduces the current to a sustain level to sustain the self-oscillating circuit to oscillate. In addition, in the FIG. 5 example, when the converted AC voltage $V'_{AC}$ drops, the LED driver 140 drops the current pulled from the electronic transformer 106 as well, as shown by 522.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
    a detection circuit configured to detect a starting of a conduction in a power supply provided via a circuit having a transformer; and
    a controller configured to control a current regulating circuit to pull a current from the circuit having the transformer at a pre-determined level for a time duration following the starting of the conduction, and pull the current at a reduced level according to a pre-determined profile after the time duration.

2. The circuit of claim 1, wherein the detection circuit is configured to detect the starting of a conduction angle adjusted by a phase cut type dimmer.

3. The circuit of claim 1, wherein the controller is configured to control the current regulating circuit to pull the current from the circuit having the transformer at the pre-determined level for the time duration following the starting of the conduction to enable the circuit having the transformer to start a self-oscillation.

4. The circuit of claim 1, wherein the controller is configured to pull the current according to the pre-determined profile that increases the current when a voltage of the power supply drops.

5. The circuit of claim 1, wherein the controller is configured to pull the current according the pre-determined profile that maintains the current at a substantially stable level when a voltage of the power supply drops.

6. The circuit of claim 1, wherein the controller is configured to pull the current according to the pre-determined profile that reduces the current when a voltage of the power supply drops.

7. The circuit of claim 1, further comprising:
    the current regulating circuit configured to pull the current from the circuit having the transformer; and
    a driving circuit configured to drive one or more light emitting diodes.

8. A method, comprising:
    detecting a starting of a conduction in a power supply provided via a circuit having a transformer; and
    pulling a current from the circuit having a transformer at a pre-determined level for a time duration following the starting of the conduction; and
    pulling the current at a reduced level according to a pre-determined profile after the time duration.

9. The method of claim 8, wherein detecting the starting of the conduction in the power supply further comprises:
    detecting the starting of a conduction angle adjusted by a phase cut type dimmer.

10. The method of claim 8, wherein pulling the current from the circuit having the transformer at the pre-determined level for the time duration following the starting of the conduction further comprises:
    pulling the current from the circuit having the transformer at the pre-determined level for the time duration following the starting of the conduction to enable the circuit having the transformer to start a self-oscillation.

11. The method of claim 8, wherein pulling the current at the reduced level according to the pre-determined profile after the time duration further comprises:
    increasing the current when a voltage of the power supply drops.

12. The method of claim 8, wherein pulling the current at the reduced level according to the pre-determined profile after the time duration further comprises:
    maintaining the current at a substantially stable level when a voltage of the power supply drops.

13. The method of claim 8, wherein pulling the current at the reduced level according to the pre-determined profile after the time duration further comprises:
    reducing the current when a voltage of the power supply drops.

14. The method of claim 8, further comprising:
    driving one or more light emitting diodes using the power supply provided via the circuit having the transformer.

15. An apparatus, comprising:
    one or more light emitting diodes (LEDs); and
    an LED driver to drive the LEDs, the LED driver including:
        a detection circuit configured to detect a starting of a conduction in a power supply provided via a circuit having a transformer;
        a current regulating circuit configured to regulating a current pulled from the circuit having the transformer; and
        a controller configured to control the current regulating circuit to pull the current at a pre-determined level for a time duration following the starting of the conduction, and pull the current at a reduced level according to a pre-determined profile after the time duration.

16. The apparatus of claim 15, wherein the detection circuit is configured to detect the starting of a conduction angle adjusted by a phase cut type dimmer.

17. The apparatus of claim 15, wherein the controller is configured to control the current regulating circuit to pull the current from the circuit having the transformer at the pre-determined level for the time duration following the starting of the conduction to enable the circuit having the transformer to start a self-oscillation.

18. The apparatus of claim 15, wherein the controller is configured to pull the current according to the pre-determined profile that increases the current when a voltage of the power supply drops.

19. The apparatus of claim 15, wherein the controller is configured to pull the current according the pre-determined profile that maintains the current at a substantially stable level when a voltage of the power supply drops.

20. The apparatus of claim 15, wherein the controller is configured to pull the current according to the pre-determined profile that reduces the current when a voltage of the power supply drops.

\* \* \* \* \*